United States Patent
Conti et al.

(10) Patent No.: US 8,864,371 B2
(45) Date of Patent: Oct. 21, 2014

(54) WIRELESS LANCE

(75) Inventors: Richard F. Conti, New Hope, PA (US); Jack Andrew Kuszyk, Lincoln University, PA (US); Renuka Rodrigo, Yardley, PA (US); David A. Saar, Titusville, NJ (US)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 13/283,229

(22) Filed: Oct. 27, 2011

(65) Prior Publication Data

US 2012/0147921 A1 Jun. 14, 2012

Related U.S. Application Data

(60) Provisional application No. 61/407,513, filed on Oct. 28, 2010.

(51) Int. Cl.
| | | |
|---|---|---|
| *G01K 1/12* | (2006.01) | |
| *G08C 23/02* | (2006.01) | |
| *C21C 5/46* | (2006.01) | |
| *G01K 13/12* | (2006.01) | |
| *F27D 21/00* | (2006.01) | |
| *G01K 1/02* | (2006.01) | |
| *H04Q 9/00* | (2006.01) | |
| *F27D 19/00* | (2006.01) | |
| *C21C 5/52* | (2006.01) | |

(52) U.S. Cl.
CPC ............... *H04Q 9/00* (2013.01); *G08C 23/02* (2013.01); *H04Q 2209/43* (2013.01); *C21C 5/4673* (2013.01); *G01K 13/125* (2013.01); *F27D 21/0014* (2013.01); *C21C 2005/5288* (2013.01); *G01K 1/024* (2013.01); *G01K 1/125* (2013.01); *C21C 5/462* (2013.01); *F27D 19/00* (2013.01); *F27D 21/00* (2013.01)
USPC .......................................................... 374/140

(58) Field of Classification Search
CPC .................. C21C 5/462; C21C 5/4673; C21C 2005/5288; F27D 19/00; F27D 21/00; H04Q 2209/43; G01K 1/024; G01K 1/125; G01K 13/125
USPC .................................... 374/140, 61, 407, 513
See application file for complete search history.

(56) References Cited

U.S. PATENT DOCUMENTS 3,594,750 A 7/1971 Mueller
3,643,509 A 2/1972 Surinx
(Continued)

FOREIGN PATENT DOCUMENTS

DE 102005001407 A1 7/2006
JP 2000028438 A * 1/2000 ............... G01K 1/02

OTHER PUBLICATIONS

Mitsugu Terada, Application of ZigBee sensor network to data acqusition and monitoring, Measurement Science Review, vol. 9, No. 6, 2009.

(Continued)

*Primary Examiner* — Lisa Caputo
*Assistant Examiner* — Brandi N Hopkins
(74) *Attorney, Agent, or Firm* — Panitch Schwarze Belisario & Nadel LLP (57) ABSTRACT

A system for wirelessly obtaining a measurement of a characteristic of a molten metal is disclosed. The system includes a contact block configured to be operatively coupled to a first end of a substantially hollow lance holder. The contact block is detachably and electrically coupled to and receives analog signals from a measurement sensor. The contact block converts the received analog signals into ultrasonic signals and transmits the ultrasonic signals through the hollow of the lance holder. A receiver block is configured to be operatively coupled to a second end of the lance holder. The second end is opposite the first end of the lance holder. The receiver block receives the ultrasonic signals from the contact block and converts the received ultrasonic signals into a digital voltage signal.

20 Claims, 6 Drawing Sheets

(56) References Cited

U.S. PATENT DOCUMENTS

| | | |
|---|---|---|
| 3,753,221 A | 8/1973 | Stevens |
| 4,056,407 A | 11/1977 | Cure |
| 4,483,630 A * | 11/1984 | Varela ........................ 374/119 |
| 4,518,839 A | 5/1985 | Taguchi et al. |
| 4,716,411 A | 12/1987 | Nakamura |
| 4,792,124 A | 12/1988 | Zonneveld |
| 4,893,516 A | 1/1990 | Knevels |
| 4,981,045 A | 1/1991 | Mountford |
| 4,998,439 A | 3/1991 | Shepard |
| 5,022,014 A * | 6/1991 | Kulczyk et al. ............... 367/87 |
| 5,037,211 A | 8/1991 | Nakashima et al. |
| 5,043,023 A | 8/1991 | Bentley |
| 5,289,354 A | 2/1994 | Clayer et al. |
| 5,319,576 A | 6/1994 | Iannadrea |
| 5,388,908 A | 2/1995 | Kendall |
| 5,568,448 A | 10/1996 | Taniguchi et al. |
| 5,675,325 A | 10/1997 | Taniguchi et al. |
| 5,703,575 A | 12/1997 | Kirkpatrick |
| 5,804,006 A | 9/1998 | Kanno et al. |
| 5,845,844 A | 12/1998 | Zosimodis |
| 5,982,297 A | 11/1999 | Welle |
| 6,236,889 B1 | 5/2001 | Soykan et al. |
| 6,778,676 B2 | 8/2004 | Groth et al. |
| 7,307,409 B2 | 12/2007 | Dams |
| 7,658,539 B2 | 2/2010 | Engelstad |
| 2005/0040570 A1 | 2/2005 | Asselborn |
| 2006/0100656 A1* | 5/2006 | Olson et al. .................. 606/181 |
| 2007/0063399 A1* | 3/2007 | Robins et al. ................ 266/225 |
| 2007/0173117 A1* | 7/2007 | Dams et al. .................. 439/595 |
| 2009/0026668 A1* | 1/2009 | Robins et al. ................. 266/99 |
| 2009/0230597 A1* | 9/2009 | Knevels ......................... 266/99 |
| 2012/0082183 A1* | 4/2012 | Beyens ......................... 374/179 |

OTHER PUBLICATIONS

S. Ejaz, M. Shafiq, M. Mughal, Real Time Implementation of Digital LFM Pulse Compression Technique over Acoustic Waveguides, International Journal of Engineering & Technology IJET-IJENS vol. 10 No. 04.

J. Zhang, Z. Huang, X.Liu, Acoustic Communication in Wireless Sensor Networks Department of Computer Science, University of Virginia.

English translation of an Office Action issued Jan. 26, 2014 in CN Application No. 201180049464.6.

* cited by examiner

WIRELESS LANCE

CROSS-REFERENCE TO RELATED APPLICATIONS

This application claims priority to U.S. Provisional Patent Application No. 61/407,513, filed Oct. 28, 2010, which is incorporated herein by reference in its entirety.

BACKGROUND OF THE INVENTION

Lances with expendable immersion sensors are typically used to measure properties of molten metals. When an immersion sensor is immersed into molten metal, measurement data, such as temperature, is communicated from the sensor device to a receiving instrument. Previously, the communication was performed using analog wiring circuits, such as those typically manufactured from copper, copper alloys or thermocouple compensating cables.

Conventional expendable molten metal immersion systems deploy devices having immersion sensors that are capable of a one-time measurement and are then discarded, as described in U.S. Pat. No. 3,643,509, the entire disclosure of which is incorporated herein by reference. Such immersion sensors are typically fixed to the distal end of a protective sleeve of the immersion device. The protective sleeve is typically manufactured from cardboard. The sensor and cardboard protective sleeve are arranged to slide fit over a hollow pipe, also known as a lance holder. The sensor is coupled to a connector member, called a contact block, as described in U.S. Pat. No. 4,893,516, the entire disclosure of which is incorporated herein by reference. The contact block is located on the pipe end and is adapted to receive the analog electrical outputs of the immersion sensor. The immersion sensor is connected to the connector member in a detachable fashion. The lance holder is internally wired with protected cables to withstand the hot environment of the pipe between the contact block and a receptacle on the end opposite of the contact block, as described in U.S. Pat. No. 5,043,023, the entire disclosure of which is incorporated herein by reference.

The receptacle provides a terminal for extending the electrical signal lines, by another analog cable, to an instrument which interprets and processes the analog signal and displays the sensor result(s). The electrical circuit, which includes the immersion sensor, the lance holder, the signal cable and the instrument, is detachably connected together by wiring and wiring connectors. Each segment of the measuring circuit, including all the electrical connections, wiring and cables are preferably constructed from materials specially compatible and compensated for the type of thermocouple or other sensor employed.

The cardboard protective sleeve of the expendable immersion sensor includes two main portions, each serving different purposes. The lower or distal portion of the protective sleeve comes in direct contact with the molten metal and is rapidly consumed in a violent reaction with the molten metal and a layer of hot slag which normally covers the molten metal surface. Sufficient mass of the cardboard sleeve is required to survive and protect the sensor at least until the sensor has completed its measurement. If the immersed cardboard sleeve prematurely fails before the measurement is obtained, in the worst case, molten metal destroys the electrical contact portion of the lance holder and the resulting damage must be repaired before another measurement can be obtained.

The second, contiguous, portion of the cardboard tube extends up and out of the molten metal bath and protects the distal end of the lance holder from metal splashing and radiant heat from the molten metal bath, slag and any close hot surface of the molten metal containment vessel. If the portion of the protective cardboard sleeve above the molten metal bath is either too short to obscure radiant heat or burns with the oxygen of the atmosphere in an acerbated fashion, the lance holder experiences localized heating. In this "hot zone", the internal wiring of the lance holder may be subjected to extreme heat that could compromise the electrical integrity of the lance's internal wires' insulation, which could also require a repair delay before a subsequent measurement can be obtained.

During each measuring cycle, the non-disposable segments of the electrical circuit within the lance holder and those segments between the lance holder terminal and the instrument may be subject to intense radiant heat, molten metal splashing, direct contact with hot molten and other solid heated surfaces. These conditions result in insulation breakdown, tension, abrasion, and wear of the wiring, cables and connectors, leading to the eventual failure of one or more segments of the electrical circuit. The failed circuit must be repaired or replaced, resulting in additional expense and putting the necessary equipment out of operation while repairs are made. Where automated mechanical immersion systems or robots are used, repair and replacement is costly in terms of manpower, materials and the downtime of the automated system. Further, in manual immersion cases, the cable connecting the lance holder to the instrumentation is typically dragged across the floor and frequently damaged by splashing metal and mobile equipment. Such cables also present tripping hazards for workers in the immediate vicinity.

Immersion lances are not the only equipment that suffer from such problems. Sensors having internal wiring circuits are used at measuring locations in foundries and cast houses, where a portion of the metal is removed and brought to a measuring location. These sensors may suffer from failure in the analog wiring after a period of time due to the extreme conditions described above. Such sensors are described in U.S. Pat. Nos. 4,056,407, 5,037,211, 5,804,006 and 5,388,908, all of which are incorporated herein by reference.

In industrial environments of the iron and steel making industry, high temperatures are routinely encountered not only in the molten metal, but also in the surfaces and structures in and around the containers and processing vessels employed in manufacturing and transferring molten metal. Sensor devices and their corresponding measuring circuits utilized in the making, monitoring and controlling of these processes are often exposed to these harsh conditions repeatedly and with sufficient exposure to result in physical destruction and/or deterioration sufficient to render the measurements inaccurate or unavailable.

In certain industrial environments, data is transmitted acoustically within the solid material of a structure or apparatus, such as the drill casing pipe of oil rigs. Downhole telemetry devices utilizing a magnetostrictive material to generate ultrasonic waves within the metal of the drill casing are described in U.S. Pat. Nos. 5,568,448 and 5,675,325. These patents disclose the use of a magnetostrictive actuator mounted at an intermediate position in a drill pipe, wherein the drill pipe acts as a resonant tube body. An excitation current applied at a predetermined frequency to coils surrounding the magnetostrictive material of the actuator causes the drill pipe to deform. The deformation creates an acoustic or ultrasonic wave that propagates through the drill pipe material. The propagating wave signals are received by a receiver disposed uphole of the actuator and processed at the surface.

The transmission efficiency of the generated acoustic waves is best at high frequencies (generally above 400 Hz). The wave transmission drops to below acceptable levels at low frequencies (generally below 400 Hz). An acoustic telemetry system according to the above noted patents requires precise placement of the actuator and unique "tuning" of the drill pipe section with the magnetostrictive device in order to achieve the most efficient transmission, even at high frequencies. Since all drilling communication systems must resolve the ever changing length of the drill string, tuning of the acoustic devices is required. This degree of attention may be cost justified given the capital investment required for oil drilling equipment, but it is unsuited to accommodate changing lengths of mechanical immersion devices in the metal making industry.

Accordingly, it is desirable to minimize the cost of maintenance, repair and replacement of damaged molten metal measuring systems by eliminating the internal wiring thereof. It is further desirable to address the safety concerns caused by wired measuring systems used for molten metal measurements.

BRIEF SUMMARY OF THE INVENTION

In one embodiment, a system for wirelessly obtaining a measurement of a characteristic of a molten metal is disclosed. The system includes a contact block configured to be operatively coupled to a first end of a substantially hollow lance holder. The contact block is detachably and electrically coupled to and receives analog signals from a measurement sensor. The contact block converts the received analog signals into ultrasonic signals and transmits the ultrasonic signals through the hollow of the lance holder. A receiver block is configured to be operatively coupled to a second end of the lance holder. The second end is opposite the first end of the lance holder. The receiver block receives the ultrasonic signals from the contact block and converts the received ultrasonic signals into a digital voltage signal.

In another embodiment, a method of transmitting at least one characteristic of a molten metal is disclosed. The method includes a contact block receiving an analog signal describing at least one characteristic of the molten metal from a measurement sensor. The contact block is operatively coupled to a first end of a lance holder. The analog signal is converted into a plurality of ultrasonic pulses. The plurality of ultrasonic pulses are transmitted through a hollow body of the lance holder to a receiver. The receiver is operatively coupled to a second end of the lance holder that is opposite the first end.

In yet another embodiment, a system for wirelessly obtaining a measurement of a characteristic of a molten metal is disclosed. The system includes a transmitting component including an ultrasonic transducer. The transmitting component is configured to be operatively coupled to a first end of a substantially hollow lance holder. The transmitting component is detachably and electrically coupled to and receives analog signals from a measurement sensor. The received analog signals are converted into ultrasonic signals. The ultrasonic transducer transmits the ultrasonic signals through the hollow of the lance holder. A receiver component is configured to be operatively coupled to a second end of the lance holder that is opposite the first end of the lance holder. The receiver component includes a receiving transducer. The receiving transducer receives the ultrasonic signals from the transmitting component and converts the received ultrasonic signals into a digital voltage signal.

BRIEF DESCRIPTION OF THE DRAWINGS

The foregoing summary as well as the following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower," and "upper" designate directions in the drawings to which reference is made. The words "inwardly," "inner," "distally," "outer," "outwardly," or "proximally" refer to directions toward and away from, respectively, the geometric center or orientation of the device and related parts thereof. The terminology includes the above-listed words, derivatives thereof and words of similar import.

Figure 1:
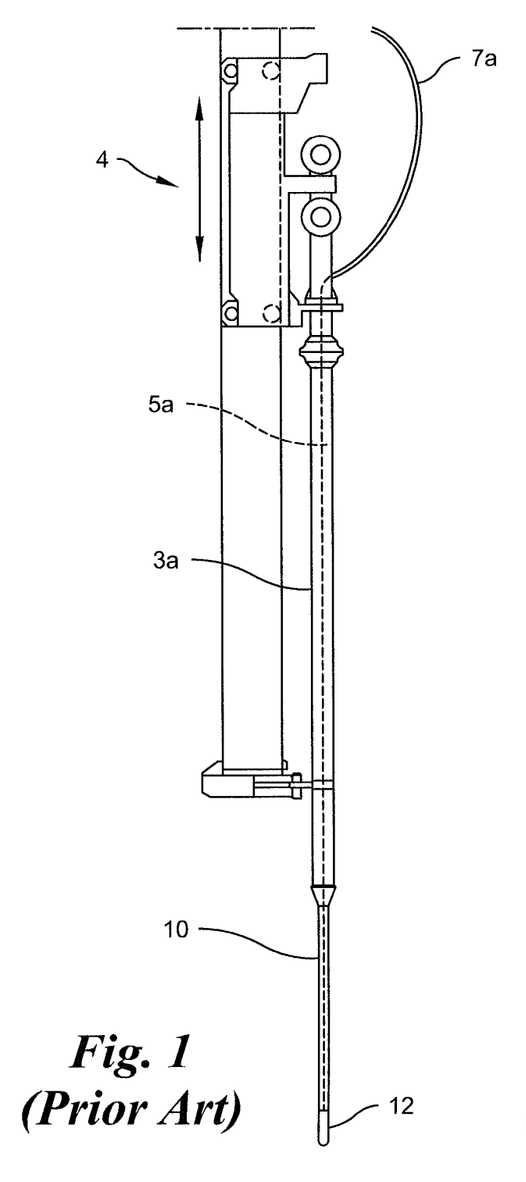
FIG. 1 is a schematic block diagram of a prior art mechanical immersion device.
Figure 2:
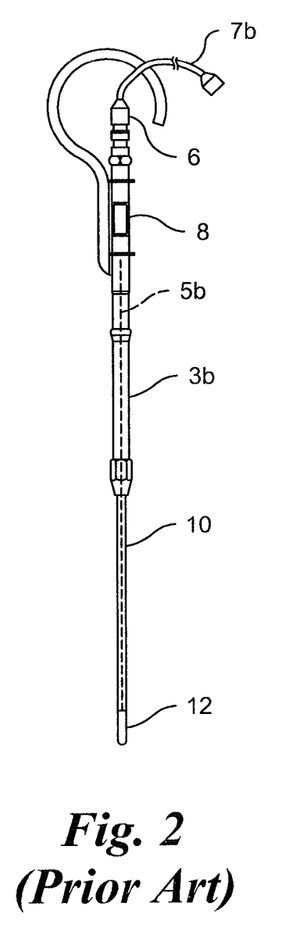
FIG. 2 is a schematic block diagram of a prior art hand immersion device.

FIGS. 1 and 2 illustrate prior art mechanical and hand operated immersion devices having a wired circuit for transmitting measurement signals from an immersion sensor (not shown). The mechanical immersion device of FIG. 1 includes a lance holder 10 coupled to a contact block 12. The lance holder 10 optionally includes an extension lance pipe 3a at an end opposite the immersion end, thus the lance holder 10 may be a single pipe or a combination of operatively coupled pipes. Preferably, the lance holder 10 is a standard pipe or a combination of standard pipes, known to those skilled in the art. In FIG. 1, a drive assembly 4 raises and lowers the lance holder 10 via the lance pipe 3a into and out of the material, typically molten metal, being sampled or tested. Internal wiring 5a transmits electrical signals from the immersion sensor (not shown) through the lance holder 10 to instrumentation (not shown). The internal wiring 5a is electrically coupled through a cable 7a to the instrumentation, which receives the transmitted signals.

The hand immersion device of FIG. 2 is similar to the mechanical immersion device of FIG. 1, except for the lack of a drive assembly 4, allowing the entire lance to be immersed manually. A handle assembly 8 is provided for use by an operator of the hand immersion device. An operator uses the handle assembly 8 to lower and raise the hand immersion device into the material being sampled. The handle assembly 8 is coupled to or integrated with the lance holder 10 at the optional lance pipe 3b. However, in other configurations of the lance holder 10, the handle assembly 8 may be positioned at other points on the lance holder 10. Internal wiring 5b transmits electrical signals from an immersion sensor (not shown) to the cable 7b through the lance holder 10. A pole to cable connector 6 connects the internal wiring 5b to the cable 7b, allowing the lance assembly to be detached from the cable 7b.

Immersion systems such as those shown in FIGS. 1 and 2 may be used to perform a measurement in molten metal. A typical measurement in molten metal consists of the steps of sliding an expendable immersion sensor onto the distal end of the lance holder 10 until electrical contact with the contact block is made. Typically, when continuity in the sensor circuit is confirmed, a permissive signal is given to the user by the instrumentation so that the immersion can proceed. An operator may physically handle the lance holder 10, or a mechanical device (drive assembly 4) may manipulate the lance holder 10 into the molten metal being sampled.

Once it has been immersed, the immersion sensor generates and outputs an electrical signal proportional to a property of the molten metal being measured (e.g., temperature). For example, this data is usually in the form of millivolts when the measured property is temperature. The electrical signal may then be converted by the instrument to the desired property of the molten metal, such as temperature or another appropriate monitoring parameter. However, the immersion sensor may also be adapted to output electrical signals relating to more than one property of the sampled metal simultaneously, such as an oxygen content of the molten metal. The oxygen content is also communicated in the form of millivolts, preferably between −500 and +500 millivolts. After the sensor has been immersed for a period of time, the instrument detects an acceptable value from the sensor and signals the end of the measurement. The immersion sensor may then be withdrawn from the molten bath. The used immersion sensor is discarded and the measuring system is available for another measurement with a new immersion sensor. In other embodiments, where immersion is not required, the immersion sensor may be replaced by a measurement sensor. A wide range of such measurement sensors are known in the art and are within the scope of this invention.

Figure 3:
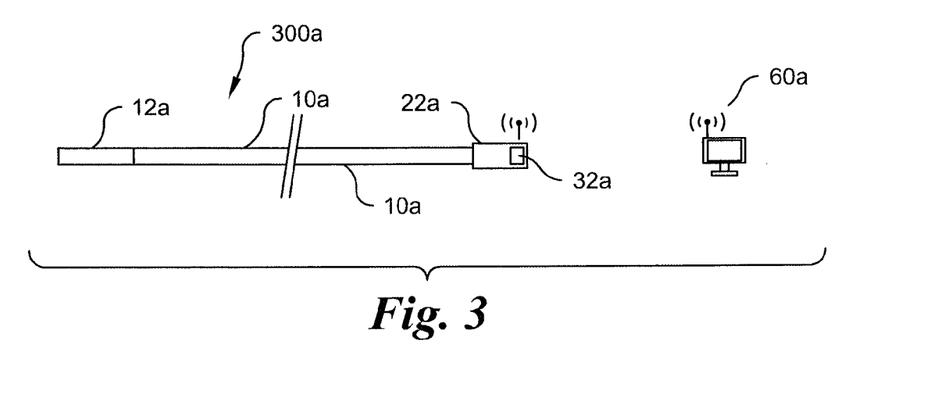
FIG. 3 is a schematic block diagram of a wireless immersion device having integrated wireless instrumentation in accordance with a first embodiment of this invention.
Figure 4:
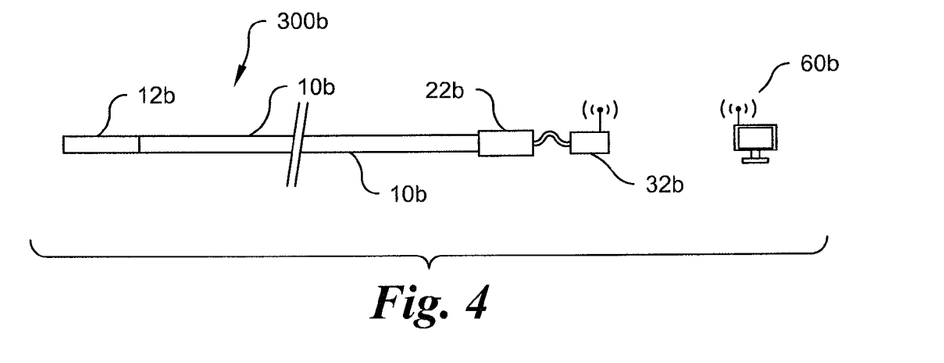
FIG. 4 is a schematic block diagram of a wireless immersion device having wireless instrumentation in accordance with a second embodiment of this invention.
Figure 5:
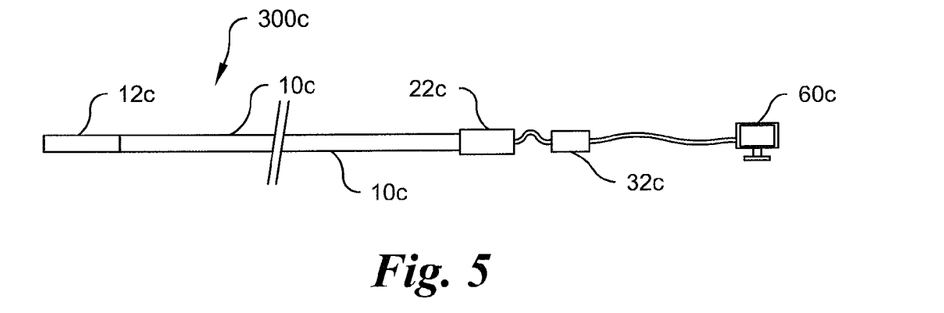
FIG. 5 is a schematic block diagram of a wireless immersion device having wired instrumentation in accordance with a third embodiment of this invention.

Referring to FIGS. 3-5, wireless immersion devices in accordance with preferred embodiments of the present invention are shown. The wireless immersion devices of FIG. 3-5 may be implemented in the mechanical and hand operated lances of FIGS. 1 and 2. In the immersion devices of FIGS. 3-5, the internal wiring 5 within the lance holder 10 and, optionally, the cable connecting the wireless immersion device to the instrumentation 60 are eliminated. Preferably, the lance holder 10 is an elongated, hollow, steel pipe. However, other materials, shapes and diameters for manufacturing the hollow lance holder may be used without departing from the scope of this invention. Further, lance holders 10 of varying lengths and internal diameters are contemplated for use with the wireless communication system described below.

Referring to FIG. 3, a block diagram of a wireless immersion device 300a having integrated wireless instrumentation according to a first embodiment of the present invention is shown. The wireless immersion device 300a includes a lance holder 10a coupled to a contact block 12a at one end (immersion or distal end) and to a receiver block 22a at the end opposite the contact block 12a. Measurement data is transmitted wirelessly from the contact block 12a to the receiver block 22a through the lance holder 10a. Thus, by wirelessly transmitting data from the contact block 12a to the receiver block 22a, wiring is eliminated in the area where heat damage is most likely to occur. The receiver block 22a includes an integrated wireless transmitter 32a that wirelessly transmits data to the instrumentation 60a for analysis and display. The wireless transmitter 32a may use any wireless communication scheme known to those skilled in the art, including long range and short range communication protocols such as ZIG-BEE, 802.11 WiFi, BLUETOOTH, Infrared and the like. Other wireless techniques for transmitting data between the wireless transmitter 32a and the instrumentation 60a may be implemented without departing from the scope of this invention.

In alternate embodiments, as shown in FIGS. 4 and 5, hardwiring in the area where most damage occurs, such as the internal wiring inside the lance holder 10 is eliminated, while hardwiring within the segment(s) that receives only limited damage, such as the connection from the receiving end 22b (FIG. 4) to the wireless transmitter 32b (FIG. 4) and/or the connection from the transmitter 32c (FIG. 5) to the instrumentation 60c (FIG. 5), may be retained. Retaining hardwiring only within segments that are less prone to damage reduces cost from the ability to use less expensive cabling where such hardwiring is retained. In a traditional wired lance, one of the wire pairs in a thermocouple circuit is an alloy of primarily copper and nickel that is considerably more expensive than pure copper. After the sensor signal is digitized at the receiver block 22, serial communication wires of only copper may be employed. Replacing these specific alloy wiring pairs with simple copper lowers the material replacement cost of the segment.

Referring to FIG. 4, a schematic block diagram of a wireless immersion device 300b having wireless instrumentation according to a second embodiment of the present invention is shown. The wireless immersion device 300b includes a lance holder 10b that has a contact block 12b and a receiver block 22b coupled to opposite ends. The contact block 12b and the lance holder 10b are substantially the same as the contact block 12a and the lance holder 10a of FIG. 3. However, the receiver block 22b does not have an integrated wireless transmitter as in FIG. 3. Instead, the wireless transmitter 32b is separately coupled to the receiver block 22b by wiring, a cable, or the like. As in FIG. 3, the wireless transmitter 32b wirelessly transmits data to instrumentation 60b for analysis and display. However, in other embodiments, the connection to the instrumentation 60 need not be wireless, as shown in FIG. 5.

Referring to FIG. 5, a schematic block diagram of a wireless immersion device 300c having wired instrumentation according to a third embodiment of the present invention is shown. The wireless immersion device 300c includes a lance holder 10c with a contact block 12c and a receiver block 22c coupled to opposite ends of the lance holder 10c. The contact block 12c and the lance holder 10c are substantially the same as the contact blocks 12a, 12b and the lance holders 10a, 10b of FIGS. 3 and 4. In FIG. 5, the receiver block 22c is coupled to a wired transmitter 32c, which is in turn coupled to instrumentation 60c by wiring. Copper wiring, cables or the like may be used to couple the receiver block 22c to the wired transmitter 32c and to the instrumentation 60c. In yet other embodiments, the wired transmitter 32c may be integrated into the receiver block 22c.

Operation of the wireless immersion devices 300 will now be described in further detail. The wireless immersion devices 300 utilize air coupled acoustic transmission of data through the air within the hollow of the lance holder 10. The acoustic data transmission system of the wireless immersion device includes the contact block 12 and the receiver block 22, operatively coupled to opposite ends of the lance holder 10. The contact block 12 is located at the molten metal immersion end of the lance holder 10. The receiver block 22 is located on the opposite end of the lance holder 10. In one embodiment, the receiver block 22 is located at the handle end of the lance holder 10. However, in other embodiments, the receiver block 22 may be located at any point along the length of the wireless immersion device 300 that is opposite the contact block 12, even where the opposite end is a termination of the lance holder 10 piping without a handle or an intermediate point between two sections of the lance holder 10 piping.

Figure 6:
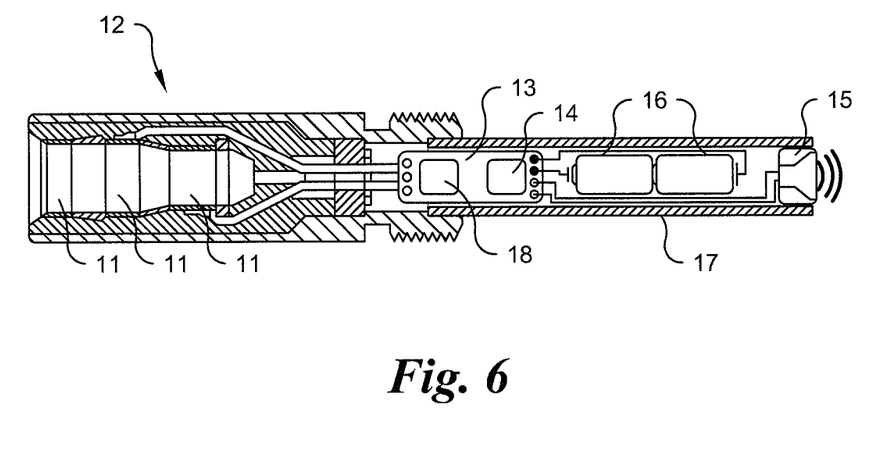
FIG. 6 is a schematic block diagram of a contact block having circuitry for generating and transmitting ultrasonic pulses.

Referring to FIG. 6, the contact block 12 includes a transmitting component housed in protective housing 17. The contact block 12 receives electrical sensor signals from the sensor head of disposable measuring devices (not shown). While the transmitting component is described in terms of the contact block 12 herein, the transmitting component may be a separate component that is operatively coupled to the contact block 12 or integrated into the contact block 12 without departing from the scope of this invention. When the immersion sensor attached to contact block 12 is immersed in the material being sampled, as described above, analog signals are produced. Circuitry, within the transmitting component, such as the analog to digital converter 18, amplifies and digitizes the received analog signals. The digitized data is transmitted by an ultrasonic transducer 15 in the contact block 12 through the hollow interior of the lance holder 10 piping to a receiving transducer 25 (FIG. 7) in the receiver block 22. In order to improve transmission quality, acoustic reflections within the lance holder 10 piping must be minimized because such reflections may arrive at the sending transducer 15 out of phase with the primary pulse period and attenuate the signal or otherwise contribute to a decrease in the signal to noise ratio. To minimize the reflections, the internal contour of the lance holder 10 piping is preferably made as uniform as possible and is configured so that reductions in cross section, hard edges and the like are minimized.

Returning to FIG. 6, all of the contact block 12 electronics are potted or otherwise suitably contained within a protective housing 17. The disposable measuring devices or sensors (not shown) are attached to the contact block 12 in a detachable manner via a plurality of contacts 11. In the embodiment of FIG. 6, two sensor circuits having three total contacts 11 are shown. One of the three contacts 11 is common to each sensor circuit. However, in other embodiments any other number of sensor circuits may be implemented, allowing for more or less signals to be received at the contact block 12. The lance holder 10 may be attached to mechanical or hand immersion equipment, as shown in FIGS. 1 and 2. However, a wide range of other industrial immersion lances are known to those skilled in the art and such immersion lances may also be suitable for use with the wireless contact block 12. The contacts 11 are electrically coupled to an electronic circuit board 13 containing a microcontroller 14 and a digital to analog converter 18 that converts the analog signals of the sensors to digital signals.

The contact block 12 is preferably detachably coupled to the lance holder 10 by, for example, threaded connections, bayonets, twist locks, or other suitable mechanical attachments. Various mechanisms for detachably coupling the contact block 12 to the lance holder 10 are known to those skilled in the art The contact block 12 is preferably powered by one or more batteries 16. For example, two AAA alkaline batteries connected in series, may be used. However, any other combination of batteries can also be employed without departing from the scope of this invention. The batteries 16 supply electrical power to the electronic circuit board 13. The ultrasonic transducer 15 is electrically coupled to the electronic circuit board 13 and is positioned on the end opposite the contacts 11 of the contact block 12.

When a measuring sensor or device is operatively coupled to the contact block 12, acoustic waves are produced by the ultrasonic transducer 15. Similarly, acoustic waves are produced when the measuring sensor or device is immersed into the molten metal. The produced acoustic waves flow into the hollow of the lance holder 10 pipe. The ultrasonic transducer 15 is preferably an air coupled piezo electric transducer, typically with a 40 KHz center frequency. Other frequencies and transducer types are known to those skilled in the art and are suited for this purpose. The acoustic pulses created by the ultrasonic transducer 15 are transmitted through the air in the hollow of the lance holder 10 piping to an acoustic receiver located at the receiver block 22 of lance holder 10.

The microcontroller 14 controls operation of the system of the contact block 12. Preferably, the microcontroller 14 is a 16-bit microcontroller. A plurality of buffers, amplifiers, converters (A/D and/or D/A) and/or other circuitry, well known to those skilled in the art, may be operatively coupled to the microcontroller 14 to assist the microcontroller 14 in performing the functions discussed herein. The microcontroller 14 creates data packets from the digitized data and encodes the data into pulses to the ultrasonic transmitter. Preferably, the data is encoded in the spaces between ultrasonic pulses. However, other encoding methods may also be employed without departing from the scope of this invention. In a preferred embodiment, the microcontroller 14 is configured to create a data packet identifying a sensor type, information regarding a first channel, information regarding a second channel and a checksum. The first and second channels preferably include sensor information such as temperature and oxygen content in terms of millivolts. In one embodiment, the packet includes 38 bits of data, with 2 bits for the sensor type, 14 bits for channel 1, 14 bits for channel 2 and 8 bits for the checksum. However, other packet configurations may be used without departing from the scope of this invention. The microcontroller 14 is preferably further configured to create a configuration packet. The configuration packet is output each time a new immersion sensor is coupled to the contact block 12. Battery voltage, duty cycle number and cold junction temperature are preferably encoded in the configuration packet.

The ultrasonic transducer 15 is initiated by transmitting a series of voltage pulses of a predetermined length, causing the ultrasonic transducer 15 to ring. The data packets are transmitted bit by bit in between the ringing of the transducer. The length of the pause between rings of the ultrasonic transducer 15 indicates whether the bit being transmitted is a "0" or a "1". The next ringing of the ultrasonic transducer 15 indicates the start of the transmission of the next bit.

The receiver component or receiver block 22 of the wireless immersion device 300 will now be described with reference to FIG. 7. The receiver block 22 includes a receiving transducer 25. The receiving transducer 25 is coupled to an optional consolidating cone 23 that focuses the incoming acoustic waves from the hollow of the lance holder 10 onto the receiving transducer 25. However, the receiver block 22 may be implemented without the consolidating cone 23 without departing from the scope of this invention. Optional internal lining 26, of consolidation cone 23, improves acoustic coupling to various lengths of lance holders 10.

The receiver block 22 is located and operatively coupled to the lance holder 10 at the end opposite of the contact block 12. In the operatively coupled position, the receiver block 22 is in acoustic communication with the interior of lance holder 10 and/or its extensions. The sound consolidating cone 23 is preferably approximately 25-150 mm long at the receiving end tapering to an orifice of approximately 1-2 mm at the outputting end to optimize the acoustic coupling to the receiving transducer 25. However, other dimensions for the sound consolidating cone 23 may be used and are within the scope of this invention. The entire consolidating cone 23 or the internal optional lining 26 of the consolidating cone 23 is preferably one of Teflon (PTFE), polyurethane with a surface hardness of approximately 40 durameter, Watershed 11122, or the like. However, other materials providing sufficient sound isolation may be used without departing from the scope of this invention.

The receiving transducer 25 is thermally insulated by surrounding material 24. Preferably, the surrounding material 24 is a low density, approximately 98-130 kg/mm$^3$ ceramic fiber or ceramic foam. Such insulating material could be, for example, KAOWOOL, available from Morgan Thermal Ceramics or ISOFRAX, available from Unifrax Corp. The receiving transducer 25 is also acoustically isolated at its attachment locations to the consolidating cone 23. Preferably, the housing of the receiving transducer 25 is acoustically isolated from spurious noise produced by vibrations of the mechanical immersion device during insertion by internal lining 30. Internal lining 30 may be, for example, a layer of synthetic viscoelastic urethane polymer, a shock absorbing and vibration damping material. Other suitable acoustic damping material, such as cork, can be employed without departing from the scope of this invention. The receiving transducer 25 is wired either directly or by use of detachable connectors to an electronic circuit board 27 and enclosed by housing 29.

The receiver block 22 includes electronics which amplify and decode the ultrasonic data received from the contact block 12. The receiving transducer 25 outputs a voltage corresponding to the received ultrasonic pulse. The digital data may then be output (wired or wirelessly) to instrumentation 60, in either digital or analog form.

If the desired output is analog, the data is decoded such that the decoded signals correspond to the same electrical signal voltages transmitted by the sensor to the contact block 12. The electronic circuit board 27 converts the digital signals by means of a digital to analog converter 28a back to analog signals that can be transmitted by an analog wiring circuit (not shown) to the instrumentation 60c (FIG. 5).

If the desired output is digital, the receiver block 22 preferably transmits the data in RS232 packets to a remote instrument 60 directly or via a radio modem. The data in the RS232 packets may be previously decoded by the receiver block 22 or may be left undecoded. Preferably, the electronic circuit board 27 is configured to communicate the digital data as a digital signal via a wireless radio link (not shown) to instrumentation 60a or 60b of FIGS. 4 and 5 for further processing and display.

Preferably, the electronic circuit board 27 includes an external power supply (not shown). However, batteries may also be used if sufficient capacity is provided. A microcontroller 31 is embedded or otherwise arranged on the electronic circuit board 27 controls the operation of the receiver block 22. Preferably, the microcontroller 31 is a 16-bit microcontroller. A plurality of buffers, amplifiers, converters (A/D and/or D/A) and/or other circuitry, well known to those skilled in the art, may be operatively coupled to the microcontroller 31 to assist the microcontroller 31 in performing the functions discussed herein. The microcontroller 31 decodes the ultrasonic data and controls the digital-to-analog and the digital-to-digital converters 28a, 28b to provide the analog and digital outputs. It also creates packets of the data to be sent over a Universal Asynchronous Receiver/Transmitter ("UART") port (not shown).

Figure 8:
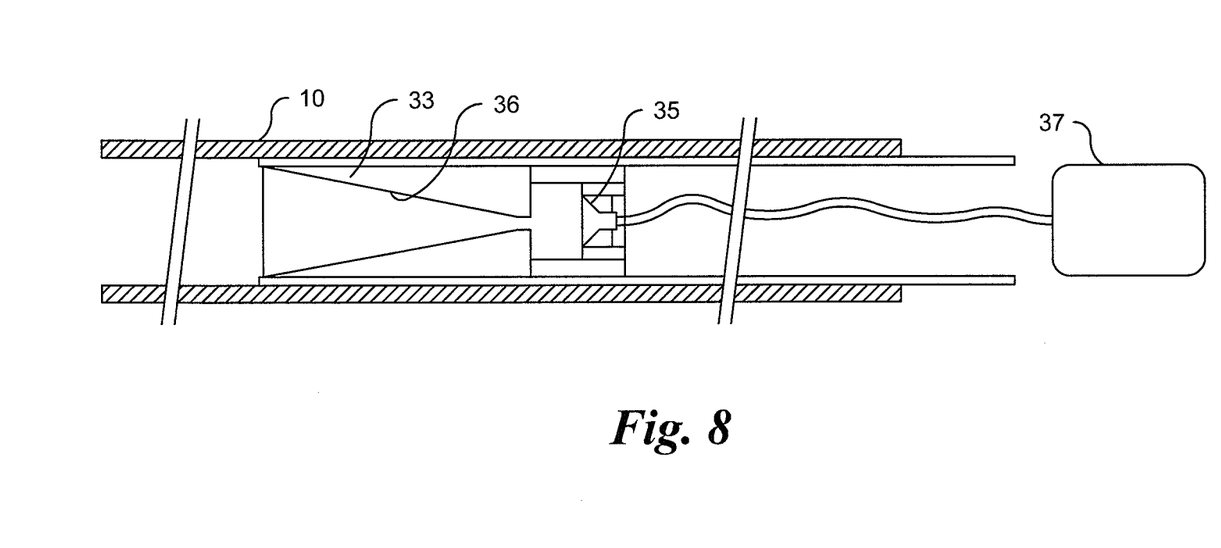
FIG. 8 is a schematic block diagram of a lance holder with an integrated receiving transducer and consolidating cone for receiving ultrasonic pulses from the contact block of FIG. 6.

In an alternate embodiment, referring to FIG. 8, the consolidating cone 33 and optional liner 36 may be located within the lance holder 10 or its extensions. This arrangement minimizes the overall distance between the ultrasonic transducer 15, located in the contact block 12 and the receiving transducer 35, which in this embodiment is also located within the lance holder 10. The electronic circuit board 37 is preferably located outside of the lance holder 10, but is operatively coupled to the receiving transducer 35 by suitable wiring or a cable. In other embodiments, the electronic circuit board 37 may be configured in various geometries that are attached to or remote from the consolidating cone 33 without departing from the scope of this invention.

Figure 7:
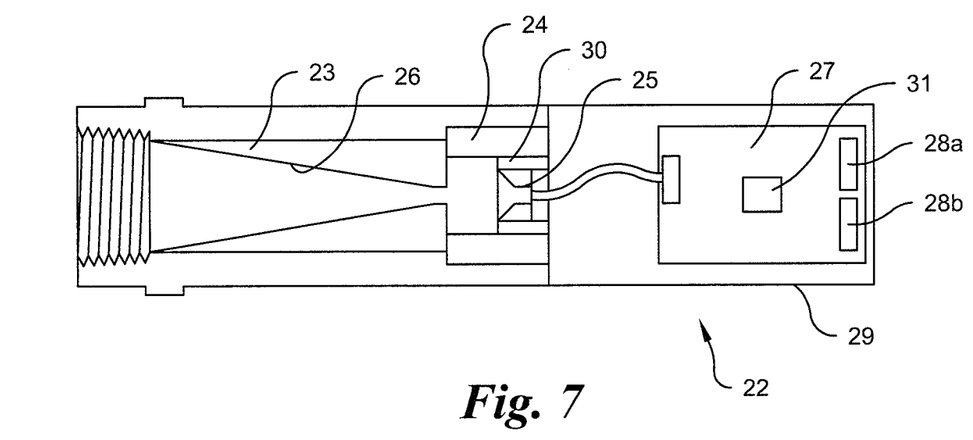
FIG. 7 is a schematic block diagram of a receiver block having circuitry for receiving ultrasonic pulses from the contact block of FIG. 6.
Figure 9:
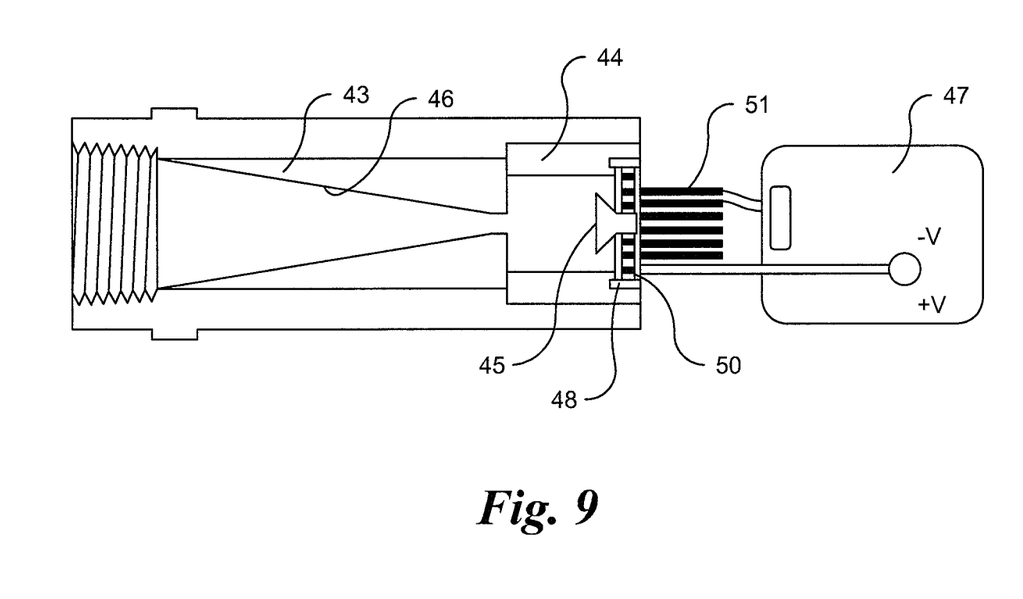
FIG. 9 is a schematic block diagram illustrating a cooling mechanism for use with the receiver block of FIG. 7.

Referring to FIG. 9, a cooling mechanism for use with the receiver block 22 of FIG. 7 is shown. The receiving transducer 45 is provided with thermal insulation 44, vibration isolation 48 and a cooling mechanism 50, 51. A cooler 50 is preferably a Peltier thermoelectric cooling module powered from the electronic circuit board 47. The cooler 50 is preferably a solid-state heat pump that operates on the Peltier effect. However, other cooling devices are known in the art and are within the scope of this invention. Optional cooling fin assembly 51 may be utilized in combination with the cooler 50 to protect the receiving transducer 45 during periods of extended use or unusually high temperatures. The consolidating cone 43, with optional liner 46, is coupled to the receiving transducer 45, as in FIGS. 7 and 8.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

The invention claimed is:

1. A system for wirelessly obtaining a measurement of a characteristic of a molten metal, the system comprising:
   a contact block configured to be operatively coupled to a first end of a substantially hollow lance holder, the contact block detachably and electrically coupled to and receiving analog signals from a measurement sensor, converting the received analog signals into ultrasonic signals and transmitting the ultrasonic signals through the hollow of the lance holder; and
   a receiver block configured to be operatively coupled to a second end of the lance holder, the receiver block receiving the ultrasonic signals from the contact block and converting the received ultrasonic signals into a digital voltage signal, wherein the second end is opposite the first end of the lance holder.

2. The system of claim 1, wherein the contact block further comprises an ultrasonic transducer for transmitting the ultrasonic signals to the receiver block.

3. The system of claim 2, wherein the receiver block further comprises a receiving transducer for receiving the ultrasonic signals.

4. The system of claim 3, wherein the receiver block further comprises a substantially conical structure having a wide end and a narrow end proximate to the receiving transducer that consolidates sound at the receiving transducer.

5. The system of claim 4, wherein the wide end of the conical structure is operatively coupled to the second end of the lance holder.

6. The system of claim 3, wherein the receiver block further comprises a digital to analog converter for converting the digital signals into an analog output representing the measurement of the characteristic of the molten metal.

7. The system of claim 3, wherein the digital signals are output as a representation of the measurement of the characteristic of the molten metal.

8. The system of claim 3, further comprising the substantially hollow lance holder, wherein the lance holder further comprises a substantially conical structure having a wide end and a narrow end that consolidates sound at the receiving transducer.

9. The system of claim 3, wherein the receiver block further comprises a cooling mechanism for cooling the receiving transducer.

10. The system of claim 3, wherein the receiver block further comprises a wired transmitter coupled to external instrumentation for outputting a signal representing the measurement of the characteristic of the molten metal.

11. The system of claim 3, wherein the receiver block further comprises a wireless transmitter for outputting a signal representing the measurement of the characteristic of the molten metal to external instrumentation.

12. The system of claim 2, wherein wirelessly transmitting the ultrasonic signal further comprises transmitting the acoustic waves through air in the hollow of the lance holder.

13. The system of claim 2, wherein the contact block further comprises a microcontroller, and wherein the ultrasonic data is transmitted in the form of data packets created by the microcontroller.

14. A method of transmitting at least one characteristic of a molten metal, the method comprising:
    receiving, by a contact block, an analog signal describing at least one characteristic of the molten metal from a measurement sensor, the contact block operatively coupled to a first end of a lance holder;
    converting the analog signal into a plurality of ultrasonic pulses; and
    transmitting the plurality of ultrasonic pulses through a hollow body of the lance holder to a receiver, the receiver operatively coupled to a second end of the lance holder that is opposite the first end.

15. The method of claim 14, wherein the acoustic waves are transmitted through air in the hollow body of the lance holder.

16. A system for wirelessly obtaining a measurement of a characteristic of a molten metal, the system comprising:
    a transmitting component including an ultrasonic transducer, the transmitting component configured to be operatively coupled to a first end of a substantially hollow lance holder, the transmitting component detachably and electrically coupled to and receiving analog signals from a measurement sensor, converting the received analog signals into ultrasonic signals and the ultrasonic transducer transmitting the ultrasonic signals through the hollow of the lance holder; and
    a receiver component including a receiving transducer, the receiver component configured to be operatively coupled to a second end of the lance holder, the receiving transducer receiving the ultrasonic signals from the transmitting component and the receiver component converting the received ultrasonic signals into a digital voltage signal, wherein the second end is opposite the first end of the lance holder.

17. The system of claim 16, wherein the receiver component further comprises a substantially conical structure having a wide end and a narrow end proximate to the receiving transducer that consolidates sound at the receiving transducer.

18. The system of claim 16, further comprising the substantially hollow lance holder, wherein the lance holder further comprises a substantially conical structure having a wide end and a narrow end that consolidates sound at the receiving transducer.

19. The system of claim 16, wherein wirelessly transmitting the ultrasonic signal further comprises transmitting the acoustic waves through air in the hollow of the lance holder.

20. The system of claim 16, wherein the receiver component further comprises a cooling mechanism for cooling the receiving transducer.

* * * * *